April 21, 1959

J. R. KOBBE ET AL 2,883,619

ELECTRICAL PROBE

Filed Feb. 29, 1956

INVENTORS
JOHN R. KOBBE
WILLIAM J. POLITS
BY

Buckhorn and Cheatham

ATTORNEYS

United States Patent Office 2,883,619
Patented Apr. 21, 1959

2,883,619

ELECTRICAL PROBE

John R. Kobbe and William J. Polits, Beaverton, Oreg., assignors to Tektronix, Inc., Portland, Oreg., a corporation of Oregon Application February 29, 1956, Serial No. 568,584

7 Claims. (Cl. 324—72.5)

This invention relates to an electrical probe and more particularly to a passive probe which will effectively transmit signal voltages from an electrical circuit under test to the input circuit of a wide band amplifier with substantially uniform frequency response over the entire range of frequencies in such band.

The probe of the present invention is particularly useful with cathode ray oscilloscopes having wide band vertical amplifiers. It has become common for such oscilloscope to have vertical amplifiers which will pass frequencies at useful amplitudes from zero to 60 megacycles or greater. Probes for connecting circuits being tested to the input of the wide band amplifier should have a uniform or flat frequency response over such range of frequencies. The probes which heretofore have been available, however, do not have such flat frequencies response at the higher frequencies at which the length of the probe cable is a substantial fraction of the wave length. At such high frequencies the cable of the probe becomes a transmission line of substantial electrical length terminated at both ends with an impedance other than the characteristic impedance of the line. This causes reflection of electrical energy from the ends of the cable. It is not practical to terminate the probe cable at either end with its characteristic impedance in order to absorb such energy. The required low impedances either unduly load the circuit being tested or result in excessive attenuation. The usual procedure is to leave the cable practically open circuited except for very large values of resistance which are used to determine the direct current and low frequency attenuation of the probe and small values of capacitance which determine the medium frequency attenuation. Such values of capacitance include the capacitance of a small adjustable capacitor ordinarily provided at the input end of the probe cable and normally adjusted to give the same attenuation for medium frequencies which the values of resistance, referred to above, provide for direct current and low frequencies. The structure just described causes the signal energy to be reflected back and forth from one end of the probe cable to the other and not only results in a frequency response which is far from flat but also causes a damped oscillation effect, known in the art as "ringing," when a signal in the form of a pulse or step function voltage is applied to the input of the probe. Various attempts have been made to provide damping or compensating circuits for preventing such ringing, including the employment of various combinations of series resistances at either or both ends of the shielded cable of the probe. Such attempts have not been effective to prevent ringing while at the same time providing a flat frequency response over the required range of frequencies.

In accordance with the present invention, it has been found that incorporating a relatively small amount of resistance in the inner conductor of the shield cable of the probe and distributing such resistance along the length of such conductor results in the complete suppression of the ringing effect referred to, while at the same time causing the probe to have a substantially flat frequency response over a range of frequencies from zero to 60 megacycles or higher. The required resistance will range from approximately 100 to 1,500 ohms depending upon the other electrical characteristics of the probe and input circuit of the amplifier. One effect of such resistance, when a pulse or step function voltage is applied through the probe, is to produce a delayed rise of signal voltage at the output end of the probe cable with respect to the rise of signal voltage at the input end of the probe cable because of the time necessary to charge the input capacitance of the amplifier through such resistance. This delay is, however, substantially completely compensated for by another effect at the input end of the probe. The small adjustable series capacitor at the input end of the cable must also be charged through the resistance of the inner conductor of the cable, which means that the voltage drop across such capacitor is initially substantially zero and that the signal voltage at the input end of the cable "overshoots." That is to say, such voltage very rapidly increases to substantially the signal voltage applied to the input of the probe, which voltage is much higher than the desired attenuated signal voltage at the output end of the cable. Such signal voltage at the input end of the cable thereafter decreases at a slower rate determined by the rate of charging of the capacitor at the input end of the cable through the resistance of the inner conductor of the cable. For values of such resistance effective to prevent ringing, the final result is that a pulse or step function signal voltage applied across the input of the probe is applied across the input circuit of the amplifier in attenuated but substantially undistorted form.

It is therefore an object of the present invention to provide an improved probe for a wide band amplifier.

Another object of the invention is to provide a probe for a wide band amplifier which has a substantially flat frequency response over the frequency range of the amplifier.

A further object of the invention is to provide a probe for a wide band amplifier which will prevent ringing when a pulse or step function signal voltage is applied to the amplifier through the probe and which will not substantially decrease the high frequency response of the amplifier.

A still further object of the invention is to provide a probe for an oscilloscope having a wide band vertical amplifier circuit with a gradually decreasing response as the frequency increases in which probe sufficient resistance is distributed along the length of inner conductor of the shielded cable of the probe to cause the overall response curve of the probe and amplifier to be of the same form as that of the amplifier alone.

Other objects and advantages of the invention will appear in the following description of a preferred embodiment given in connection with the attached drawing of which:

Figure 1:
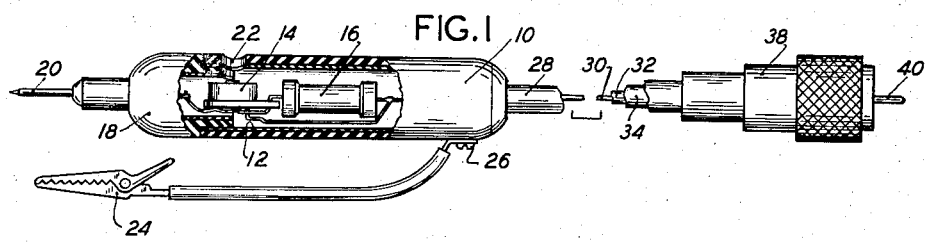
Fig. 1 is a side elevation of a probe in accordance with the present invention with part of the probe casing broken away to show the interior thereof.

Referring more particularly to the drawings, the probe of Fig. 1 is a known type of probe except for the inner conductor of its cable and includes a probe casing 10 of insulating material having an internal metallic shield 12. The probe casing contains an adjustable capacitor 14 and a resistor 16 and has one end closed with a plug 18 of insulating material through which extends a probe pin 20. The capacitor 14 may be adjusted through an aperture 22 in the wall of the probe casing 10 and a ground wire 24 may be connected to the shield 12 of the probe casing 10 by means of a screw 26. A coaxial cable 28 having an inner conductor 30, a layer of insulating material 32, and an outer shielding conductor 34 surrounded by another layer of insulating material 36 extends between the probe casing 10 and a connector plug 38 for connecting the probe to an amplifier, the connecting plug having a central pin 40 insulated from the outer shell of the plug 38. The shielding conductor 34 of the cable is connected to the shield 12 of the probe casing and to the shell of the plug 38. The resistor 16 and capacitor 14 are connected in parallel and then in series between the pin 20 and one end of the inner conductor 30 of the cable 28, such inner conductor having its other end connected to the pin 40.

Figure 2:
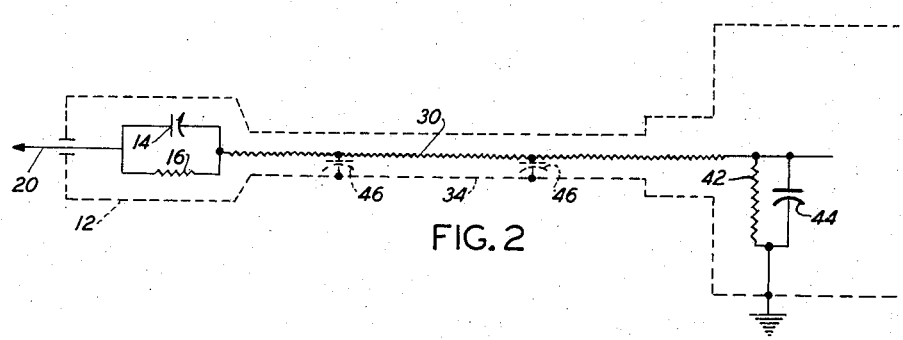
Fig. 2 is a schematic diagram of the circuit of the probe of Fig. 1 also showing the capacitance and resistance of the amplifier input circuit and indicating certain of the distributed capacitance.

As a specific example, the resistance to ground, indicated at 42 in Fig. 2, across the input circuit of the amplifier may be one megohm and the capacitance, indicated at 44, of the input circuit to ground, including the grid to ground capacitance of the first tube, may be 20 micromicrofarads. Also, the effective distributed capacitance of the probe cable, including that in the probe casing and connector plug, may, for example, also be 20 micromicrofarads. Such distributed capacitance is indicated by the dotted capacitors 46 and is effectively in parallel with the input circuit of the amplifier. For a probe having a ten-to-one attenuation, which is a common value, the resistor 16 may have a value of nine megohms and the capacitor 14 may be adjusted to have a value of approximately 4.4 micromicrofarads. Under these conditions, the ratio of capacitive reactance in series with the amplifier input to the parallel capacitive reactance of the probe and amplifier input circuit is substantially equal to the ratio of the resistance in series with the amplifier input circuit to the parallel resistance of such circuit. For direct current and low and medium frequencies, the voltages appearing across the input circuit of the amplifier, i.e., between the grid of the first tube and ground is substantially one-tenth of the voltage applied between the probe pin 20 and the ground wire to provide an attenuation of ten-to-one. This relation does not, however, hold for the higher frequencies when an inner conductor having negligible resistance is employed in the probe cable.

Figure 3:
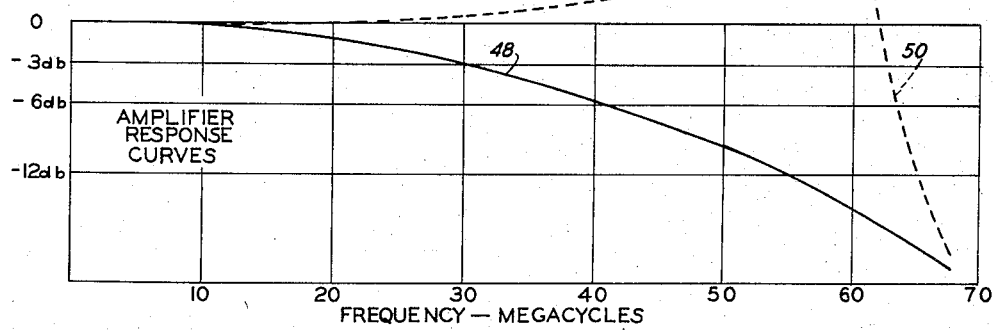
Fig. 3 is a graph showing typical response curves of the amplifier when used with the probe of the present invention and when used with prior art probes.
Figure 4:
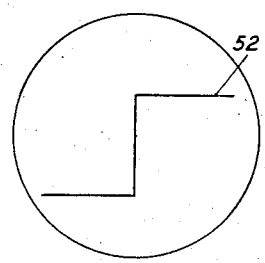
Fig. 4 is a diagrammatic view showing the type of trace of a step function voltage obtained on the screen of a cathode ray tube of an oscilloscope having a wide band vertical amplifier and employing a probe in accordance with the present invention.
Figure 5:
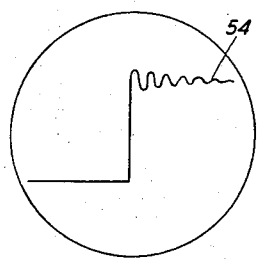
Fig. 5 is a view similar to Fig. 4, showing the type of trace obtained with probes of the prior art.

The curve 48 of Fig. 3 of the drawing represents a typical output characteristic of a high quality wide band amplifier supplied with an input voltage of constant amplitude and variable frequency. For example, the output of the amplifier may be down three decibels at 30 megacycles, down six decibels at 41 megacycles and down twelve decibels at 55 megacycles. Such a response curve may be obtained from a high quality wide band amplifier if fed from a source of voltage of constant amplitude and variable frequency positioned immediately adjacent the input of the amplifier. When a probe having a conventional flexible cable of substantial length and an inner conductor of negligible resistance is employed, however, the overall response curve of the probe and amplifier at the higher frequencies is of the form indicated by the dotted curve 50. Also, when a step function signal voltage is impressed through the probe from a source immediately adjacent the amplifier, a trace, such as shown at 52 in Fig. 4, is obtained upon the screen of the oscilloscope. When the same signal is fed through a conventional prior art probe having an inner conductor of negligible resistance in its connector cable, the trace obtained is of the form shown at 54 in Fig. 5, indicating that a damped electrical oscillation is being caused by the probe. When the probe of the present invention having an inner conductor in the probe cable with the proper amount of series resistance distributed along its length is employed, however, the damped oscillation, referred to above, is completely eliminated and the oscilloscope trace of a step function voltage becomes substantially that of Fig. 4. Furthermore, the overall frequency response curve becomes substantially that of curve 48 of Fig. 3.

As stated above, the total resistance of the inner conductor may range from approximately 100 ohms to 1500 ohms. In the specific example given above, the length of the cable between the probe casing and the connector plug was 42 inches and a value of resistance of approximately 700 ohms was found to completely eliminate the damped oscillation without materially decreasing the high frequency response of the amplifier. Such a value of resistance can be obtained in a wire of suitable size by using wire made of known high resistance alloys, for example, a nickel chromium alloy. The required value of resistance is not extremely critical but higher values than that necessary to prevent ringing serve no useful result. Such required amount of resistance will increase with increased length of cable but, in general, such increase will not be proportional to the increase in length of cable. The amount of resistance will also increase with a decrease in the total capacitance across the input circuit of the amplifier and will increase with the attenuation factor of the probe. That is to say, the resistance will be less for a five-to-one attenuation than it will be for a ten-to-one attenuation but very little increase in resistance is required as the attenuation is increased above a ten-to-one attenuation. It will be apparent that a plurality of resistors may be connected in series in the transmission line, for example, seven 100 ohm resistors might be spaced along the inner conductor of the cable of the specific example, above given, and connected in series with such conductor, but such a construction is not as practical mechanically, as the construction shown in the drawings, although it is effective so far as electrical properties are concerned.

We claim:

1. A probe for a wide band amplifier, said probe comprising a cable for connection at one end to said amplifier, and an input circuit including a resistor and capacitor at the other end of said cable, said cable having an outer shielding conductor and an inner conductor connecting said input circuit to said amplifier, said cable being terminated at its ends in other than its characteristic impedance, said inner conductor having an amount of series resistance distributed along its length which suppresses electrical oscillations tending to occur as a result of refleoton of signal energy from the ends of said cable.

2. A probe for a wide band amplifier, said probe comprising a cable for connection at one end to said amplifier, and an input circuit including a resistor and capacitor at the other end of said cable, said cable having an outer shielding conductor and an inner conductor connecting said input circuit to said amplifier, said cable being terminated at its ends in other than its characteristic impedance, said inner conductor having an amount of series resistance distributed along its length which suppresses without substantially changing the frequency response of said amplifier damped electrical oscillations tending to occur when a pulse signal is applied to said amplifier through said probe.

3. A probe for a wide band amplifier, said probe comprising a probe cable, a probe casing of conducting material at one end of said cable, an input circuit including a resistor and capacitor positioned in said casing, said cable having an outer shielding conductor for connecting said casing to the casing of said amplifier and an inner conductor for connecting said input circuit to said amplifier, said cable being terminated at its ends in other than its characterisitc impedance, said inner conductor being of resistance material providing an amount of series resistance distributed along its length which will suppress without substantially changing the frequency response of said amplifier damped electrical oscillations tending to occur as a result of reflection of signal energy from the ends of said cable.

4. A probe for a wide band amplifier, said probe comprising a probe cable, a probe casing of conducting material at one end of said cable, an input circuit including a resistor and capacitor positioned in said casing, said cable having an outer shielding conductor for connecting said casing to the casing of said amplifier and an inner conductor for connecting said input circuit to said amplifier, said cable being terminated at its ends in other than its characteristic impedance, said inner conductor having a total amount of series resistance therein between approximately 100 and 1500 ohms which resistance is distributed along the length of said cable.

5. A probe for an oscilloscope having a wide band amplifier, said probe comprising a probe casing, a probe pin extending from the interior of said casing, a cable extending between said casing and said amplifier and having an outer shielding conductor and an inner conductor insuflated from said shielding conductor, a resistor and a capacitor positioned in said casing and connected in parallel with each other and in series between said probe pin and said inner conductor, said cable being terminated at its ends in other than its characteristic impedance, said inner conductor being of resistance material providing an amount of series resistance distributed along its length which will prevent damped electrical oscillations in said probe cable when a pulse signal voltage is applied to said amplifier through said probe.

6. A probe for an oscilloscope having a wide band amplifier, said probe comprising a casing providing a probe shield of electrical conducting material around the interior of said casing, a probe pin extending from the interior of said casing and insulated from said shield, a cable extending between said casing and said amplifier and having an outer shielding conductor connected to said shield and an inner conductor insulated from said shielding conductor, a resistor and a capacitor positioned in said casing and connected in parallel with each other and in series between said probe pin and said inner conductor, said cable being terminated at its ends in other than its characteristic impedance, said inner conductor being of resistance material providing a total resistance between approximately 100 and 1500 ohms which resistance is distributed along the length of said conductor.

7. A probe for an oscilloscope having a wide band amplifier, said probe comprising a casing providing a probe shield of electrically conducting material about its interior, a probe pin extending from the interior of said casing and insulated from said shield, a cable extending between said casing and said amplifier and having an outer shielding conductor connected between said shield and the ground circuit of said amplifier and an inner conductor insulated from said shielding conductor, an attenuating and compensating resistor and capacitor positioned in said casing each connected between said probe pin and the adjacent end of said inner conductor, said capacitor being adjustable to make the ratio of its capacitance to the capacitance to ground of the input circuit of said amplifier including said cable substantially equal to the ratio of the resistance to ground of said input circuit to the resistance of said resistor, said cable being terminated at its ends in other than its characteristic impedance, said inner conductor having an amount of series resistance distributed along its length which will prevent damped electrical oscillation in said cable due to reflections of signal energy from the ends of said cable.

References Cited in the file of this patent

UNITED STATES PATENTS

| | | |
|---|---|---|
| 2,622,152 | Rosch | Dec. 16, 1952 |
| 2,685,673 | Avins | Aug. 3, 1954 |

OTHER REFERENCES

Kline: Pages 3–15, Oscillographer, vol. 14, No. 3, July–September 1953.

Kezer: Page 2102, Instruments & Automation, vol. 28, December 1955.